United States Patent
Varma et al.

(10) Patent No.: US 10,781,376 B2
(45) Date of Patent: Sep. 22, 2020

(54) METHOD OF CONVERSION OF GLYCEROL TO HYDROCARBON FUELS

(71) Applicant: Purdue Research Foundation, West Lafayette, IN (US)

(72) Inventors: Arvind Varma, West Lafayette, IN (US); Yang Xiao, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/150,746

(22) Filed: Oct. 3, 2018

(65) Prior Publication Data

US 2019/0153329 A1 May 23, 2019

Related U.S. Application Data

(60) Provisional application No. 62/568,011, filed on Oct. 4, 2017.

(51) Int. Cl.
*C10G 3/00* (2006.01)
*B01J 29/44* (2006.01)
*B01J 35/10* (2006.01)

(52) U.S. Cl.
CPC ............ *C10G 3/50* (2013.01); *B01J 29/44* (2013.01); *B01J 35/1019* (2013.01); *B01J 35/1023* (2013.01); *C10G 3/49* (2013.01); *C10G 2300/1011* (2013.01); *C10G 2300/4006* (2013.01); *C10G 2300/4012* (2013.01); *C10G 2400/30* (2013.01)

(58) Field of Classification Search
CPC .... C10G 3/50; C10G 3/49; C10G 2300/1011; C10G 2300/4006; C10G 2300/4012; C10G 2400/30; B01J 35/1019; B01J 35/1023; B01J 29/44
See application file for complete search history.

(56) References Cited

U.S. PATENT DOCUMENTS

2011/0046423 A1* 2/2011 Sughrue ................ C10G 3/45
585/240

OTHER PUBLICATIONS

Hoang et al. ("Conversion of Glycerol to Alkyl-aromatics over Zeolites" Energy Fuels 2010, 24, 3804-3809) (Year: 2010).*

* cited by examiner

*Primary Examiner* — In Suk C Bullock
*Assistant Examiner* — Jason Y Chong
(74) *Attorney, Agent, or Firm* — Purdue Research Foundation

(57) ABSTRACT

A method for producing hydrocarbons from glycerol. The method includes packing a catalyst comprising a noble metal and a support material into a reactor, introducing a reactant mixture containing glycerol into the reactor such that the reactant mixture containing methane is in close contact with the reactant mixture, and heating the reactant mixture containing glycerol to a temperature for a contact time.

14 Claims, 4 Drawing Sheets

METHOD OF CONVERSION OF GLYCEROL TO HYDROCARBON FUELS

CROSS-REFERENCE TO RELATED APPLICATIONS

The present U.S. patent application is related to and claims the priority benefit of U.S. Provisional Patent Application Ser. No. 62/568,011 filed Oct. 4, 2017, the contents of which are hereby incorporated by reference in their entirety into the present disclosure.

TECHNICAL FIELD

The present application relates to production of hydrocarbons fuels from glycerol, especially through the use of bifunctional catalysts.

BACKGROUND

This section introduces aspects that may help facilitate a better understanding of the disclosure. Accordingly, these statements are to be read in this light and are not to be understood as admissions about what is or is not prior art.

As a potential substitute for fossil fuels, biodiesel, produced mainly from vegetable oil and alcohols via esterification and/or transesterification, has become increasingly attractive owing to its environmental benefits and renewable properties. In most cases, about 10% (by weight) glycerol is generated as the main byproduct of biodiesel production, resulting in its large surplus and low price. Thus, by utilization of glycerol, biodiesel economy could be further improved. As a chemical, glycerol is utilized in animal feed, cosmetics, drugs and as a feedstock for conversion to high value chemicals. For these applications, not only chemistry, but also separation processes must be developed. Fuel, rather than chemicals, is another choice for valorization of glycerol, which avoids purification of products since reaction mixtures could be used directly as fuels. Combined with biodiesel production, glycerol to hydrocarbon (GTH) conversion can provide additional renewable energy, which contributes further to independence from fossil fuels.

Owing to its high oxygen content (52 wt %), glycerol cannot be used directly as a fuel since the high oxygen content results in fuel degradation and poor combustion performance. It is, instead, preferable to convert glycerol to other fuels, e.g. $H_2$, syngas and fuel additives. Because $H_2$ raises storage and safety concerns, while syngas can be produced from alternative cheaper sources, glycerol-based $H_2$ and syngas routes are generally not followed. Glycerol-based fuel additives, such as carbonate, propylene glycol, butanol, acrolein and glyceryl acetal, could increase octane rating of fuels or serve as corrosion inhibitors or lubricants. Unfortunately, these various additives maintain either high oxygen content, high viscosity or low heat value. Thus, current common ways of converting glycerol to fuels are unsatisfactory, owing either to low value product or insufficient combustion performance.

Hydrocarbon fuels play an essential part in the global energy chain, owing to their high energy density and ease of transportation. It is a recent idea to convert glycerol to hydrocarbon fuels directly, as reported by a few publications. Some researchers used a two-bed reactor, packed with Pd/ZnO and H-ZSM-5 sequentially, successfully converting glycerol to alkyl-aromatic hydrocarbons with a yield of ~60% (Note: The H in H-ZSM-5 means acidic ZSM-5 and its preparation is as explained in Appendix A of this specification). Instead, using one-bed reactor packed with H-ZSM-5, other researchers obtained 30-40% yield of hydrocarbons from glycerol using alcohols as solvents, while some other researchers reached ~25% yield and 4-h catalyst life by NaOH pre-treatment of H-ZSM-5.

Thus there is an unmet needed for a more efficient method of converting glycerol into hydrocarbon fuels.

SUMMARY

A method for producing hydrocarbons from glycerol is disclosed. The method includes packing a catalyst comprising a noble metal and a support material into a reactor, introducing a reactant mixture containing glycerol into the reactor such that the reactant mixture containing methane is in close contact with the reactant mixture; and heating the reactant mixture containing glycerol to a temperature for a contact time.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting.

DETAILED DESCRIPTION

Figure 1:
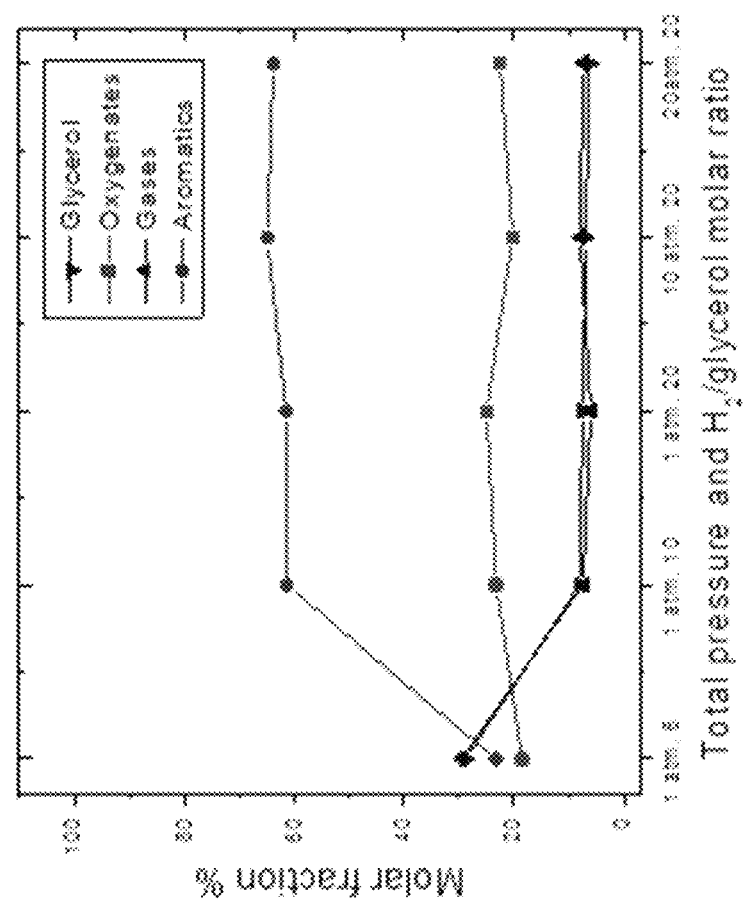
FIG. 1 shows effects of total pressure and $H_2$/glycerol ratio at 400° C. and 6 g cat·hr/g glycerol.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

This disclosure focuses on using bifunctional catalysts, which have both noble metal and acidic active sites, to efficiently convert glycerol into hydrocarbon fuels.

Figure 4:
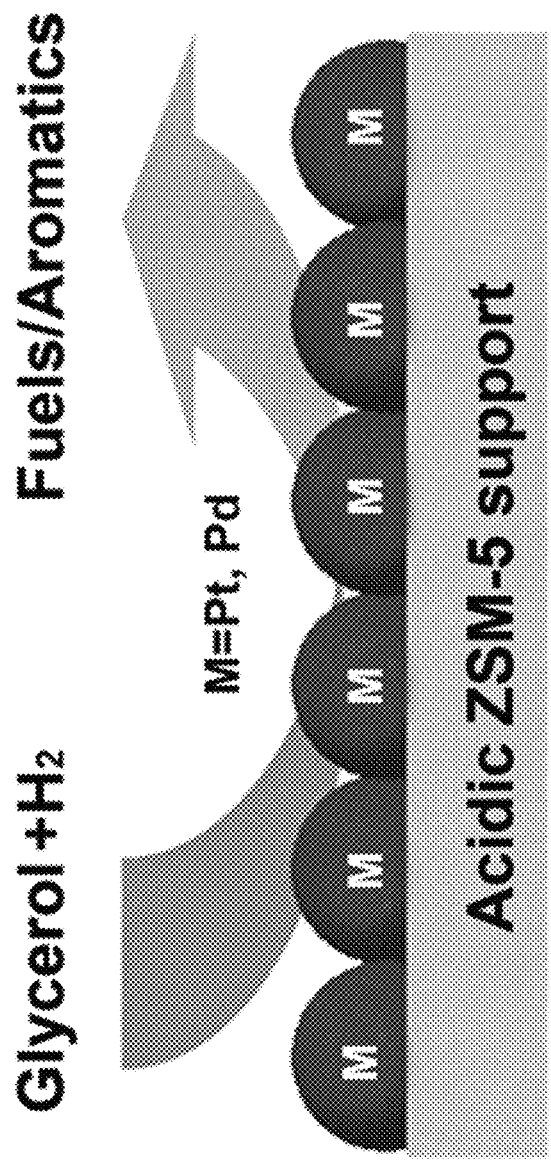
FIG. 4 is a pictorial representation of the process schematically shown in Scheme 1.

In this description, use of bifunctional noble metals supported on acidic H-ZSM-5 (Pt/H-ZSM-5 and Pd/H-ZSM-5) for conversion of glycerol to hydrocarbon fuels is disclosed. The process is schematically shown in Scheme 1 below and in FIG. 4.

Scheme 1. Glycerol to Hydrocarbon (GTH) Fuels via Bifunctional Catalysts

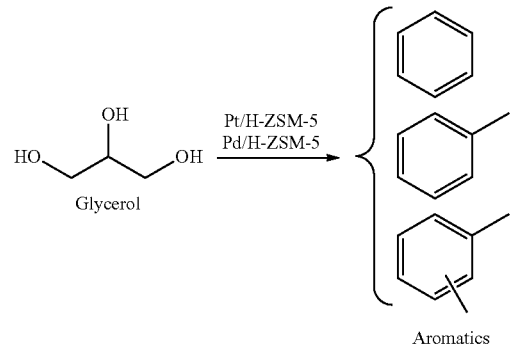

Aromatics

For purposes of this disclosure, the term "bi-functional" denotes "hydrodeoxygenation" and "aromatization", which are carried out by noble metal and ZSM-5, respectively. Further, in the context of this disclosure the terms "bifunctional catalyst", sometimes simply referred to as catalyst, refer to a materials system comprising a noble material such as but not limited to platinum or palladium supported on a support material such as but not limited to ZSM-5 zeolite.

Referring to Scheme 1, shown above, there are two catalysts indicated, namely Pt/ZSM-5 and Pd/ZSM-5, respectively. It should be noted, however, that in a given process or method of this disclosure, along with ZSM-5, either Pt or Pd is used. It should be note that Pt and Pd were not used at the same time in the experiments of this disclosure.

In experiments leading to this disclosure, three catalytic materials, namely H-ZSM-5, Pt/H-ZSM-5 and Pd/H-ZSM-5, were studied. Chloroplatinic acid hydrate and palladium (II) nitrate hydrate were used as metal precursors, while H-ZSM-5 was obtained by calcining ammonium form ZSM-5 (Si/Al=40) in air at 500° C. for 4 h. Pt and Pd were loaded on H-ZSM-5 by incipient wetness impregnation (IWI) method to obtain 5 wt % Pt/H-ZSM-5 and 5 wt % Pd/H-ZSM-5 catalysts, respectively. In other sections, metal loadings and details of H-ZSM-5 are not noted explicitly when describing the catalysts. Thus, e.g., Pt/H-ZSM-5 refers to 5 wt % Pt placed on H-form ZSM-5 with a Si/Al ratio of 40. These catalysts were characterized by BET, chemisorption, TEM and XRD techniques. The catalyst testing experiments were conducted in a continuous flow reactor. The standard reactor operating conditions were 400° C., 1 atm total pressure, 2.25 g catalyst, mixed gas of $N_2$ and $H_2$ at flow rates of 100 mL/min and 15-200 mL/min respectively, and pure glycerol feed rate of 0.3 mL/h (liquid, at room temperature). All experiments were conducted under excess hydrogen flow (feed molar ratio of $H_2$ to glycerol ~10).

For all the three catalytic materials (H-ZSM-5, Pt/H-ZSM-5 and Pd/H-ZSM-5) studied in the present work, BET, TEM, XRD and chemisorption measurements were conducted to obtain their physical and chemical properties. The BET results show that specific surface areas are in the range of 400-500 $m^2/g$, while the pore diameters are 0.5-0.6 nm, which are both consistent with those reported in the literature. As compared with H-ZSM-5, after metals (Pt and Pd) are loaded on the support, specific surface areas and average pore diameters decrease somewhat. The metal dispersions (24.3% for Pt, 29.7% for Pd) and particle sizes (3.6 nm for Pt, 3.2 nm for Pd) obtained from chemisorption are consistent with the results from TEM. The XRD patterns for H-ZSM-5 are compared to diffraction patterns for MFI (ZSM-5) (Note: ZSM-5, Zeolite Socony Mobil-5 (framework type MFI from ZSM-5 (five)), is an aluminosilicate zeolite belonging to the pentasil family of zeolites.) reported in International Zeolite Assoction (IZA) structure database. XRD patterns of Pt/H-ZSM-5 and Pd/H-ZSM-5 are similar to unsupported H-ZSM-5, and no Pt or Pd peaks are identified, likely due to low metal content (5 wt %) and high metal dispersions (20-30%). Preliminary experiments, using Pd/H-ZSM-5 as catalyst, were conducted to investigate the effects of contact time (W/F), total pressure, $H_2$/glycerol ratio and temperature on glycerol conversion and liquid hydrocarbon yield. Unit of Contact Time (t) is obtained as follows:

F (Species flowrate): $g_{glycerol}$/hr
W (Catalyst packing amount): $g_{cat}$
Definition of Contact Time:

$$t = W/F = (g_{cat})/(g_{glycerol}/\text{hr}) = g_{cat}\text{hr}/g_{glycerol}$$

It was found that long W/F and high temperature are preferred to obtain higher glycerol conversion and liquid hydrocarbon yield, while high pressure and high $H_2$/glycerol ratio are not as important. Thus, standard conditions, as follows, W/F=6 g cat·hr/g glycerol, T=400° C., $p_{total}$=1 atm and $H_2$/glycerol molar ratio=10, were used to obtain the effects of the above operating conditions.

Under the standard conditions, product distributions over H-ZSM-5, Pt/H-ZSM-5 and Pd/H-ZSM-5 are shown in Table 1 below.

TABLE 1

Typical product distributions for H-ZSM-5, Pt/H-ZSM-5 and Pd/H-ZSM-5 catalysts at 1 atm, 10 $H_2$/glycerol molar ratio, 400° C. and 6 g cat · hr/g glycerol

| General | | | | Details | | | | |
|---|---|---|---|---|---|---|---|---|
| | Molar fraction % | | | | | Molar fraction % | | |
| Name | H-ZSM-5 | Pt/H-ZSM-5 | PdZH-ZSM-5 | Chemical species | Molecular Formula | H-ZSM-5 | Pt/H-ZSM-5 | Pd/H-ZSM-5 |
| Glycerol | 9.78 | 6.75 | 8.01 | Glycerol | $C_3H_8O_3$ | 9.78 | 6.75 | 8.01 |
| Oxygenates | 58.32 | 32.46 | 23.23 | Acetaldehyde | $C_2H_4O$ | 0.32 | 1.32 | 2.31 |
| | | | | Propanal | $C_3H_6O$ | 3.22 | 2.37 | 4.92 |
| | | | | Acrolein | $C_3H_4O$ | 54.21 | 27.73 | 13.84 |
| | | | | Acetol | $C_2H_6O_2$ | 0.57 | 1.04 | 2.16 |
| Gases | 8.73 | 11.87 | 7.43 | Methane | $CH_4$ | 0.65 | 1.00 | 1.33 |
| | | | | Ethylene | $C_2H_4$ | 3.25 | 4.11 | 2.29 |
| | | | | Propylene | $C_3H_6$ | 4.83 | 6.76 | 3.81 |
| Aromatics | 23.17 | 48.92 | 61.33 | Benzene ($C_6$) | $C_6H_6$ | 0.00 | 2.20 | 2.52 |
| | | | | Toluene ($C_7$) | $C_7H_8$ | 0.75 | 5.41 | 6.31 |
| | | | | p-Xylene ($C_8$) | $C_8H_{10}$ | 6.74 | 9.46 | 16.28 |
| | | | | m-Xylene ($C_8$) | $C_8H_{10}$ | 0.98 | 14.57 | 11.55 |
| | | | | o-Xylene ($C_8$) | $C_8H_{10}$ | 1.27 | 3.85 | 6.24 |
| | | | | Cumene ($C_9$) | $C_9H_{12}$ | 1.58 | 8.16 | 12.32 |
| | | | | $C_9$+ | | 11.85 | 5.27 | 6.11 |

Referring to Table 1, there are always more than 10 components in products, including unreacted glycerol, oxygenates, gases and aromatics, where aromatics are the target products as hydrocarbon fuels. Without loading metals, H-ZSM-5 alone converts glycerol primarily to oxygenates (mainly acrolein), while $C_6$-$C_8$ aromatics yield is ~11%. High oxygenate content implies low glycerol hydrodeoxygenation (HDO) ability of H-ZSM-5. In contrast, metal (Pt or Pd) supported H-ZSM-5 produces lower oxygenates yields and higher aromatics yields.

HDO of glycerol via either dehydration/hydrogenation or hydrogenation/dehydration pathways, includes two or three consecutive reactions of C—O bond cleavages, producing monohydric alcohols or short-chain hydrocarbons, respectively. Since contents of oxygenates decrease by ~20-30%, it is thus deduced that addition of transition metals (Pt and Pd) to H-ZSM-5 enhances C—O bond cleavages of glycerol. In the presence of metals, more aromatic hydrocarbons, instead of HDO products such as monohydric alcohols or short-chain hydrocarbons, are found in Table 1, which implies that the HDO products are converted to aromatic hydrocarbons over H-ZSM-5 through a shape selectivity mechanism.

Shape-selective catalysis was reported in literature. It is well known that, by restricting undesired species, topology of zeolites plays a key role in shape-selectivity. In addition, zeolite acidity is also a significant factor, which influences activity, selectivity of reactions and product distribution. The aromatization of $C_5$ and $C_6$ paraffins over ZSM-5 was discovered in the late 1960's, followed by use of ethane in the 1980's and of methane in 1990's. Aromatization of olefin and monohydric alcohols were also achieved, obtaining gasoline with high content of aromatics. Among these, methanol-to-gasoline (MTG) and ethanol-to-gasoline (ETG) are two representative processes that convert short-chain alcohols to gasoline-range hydrocarbon fuels.

Thus, it is assumed that in the present experiments, two main reactions occur sequentially in the GTH process: hydrodeoxygenation and aromatization. Specifically, bifunctional catalysts, containing both noble metals (Pt or Pd) and acidic support (H-ZSM-5), deoxygenate glycerol to oxygenates and other intermediates such as short-chain hydrocarbons (both paraffins and olefins) and/or monohydric alcohols. Then aromatics are generated by combining short-chain species in the channel (diameter similar to kinetic diameter of aromatics) or on the acidic sites of H-ZSM-5 zeolite.

The effects of total pressure and $H_2$/glycerol molar ratio on glycerol conversion and product distribution are shown in FIG. 1. Under atmosphere pressure, when $H_2$/glycerol molar ratio increases above 10, glycerol conversion and product distributions do not change significantly. Similarly, the total pressure in the range of 1 atm-20 atm does not influence glycerol conversion and product distribution.

The molecular formula of glycerol is $C_3H_8O_3$. Thus, theoretically, three moles of $H_2$ are needed to fully deoxygenate glycerol. From FIG. 1, $H_2$/glycerol molar ratio of 6 gives a lower conversion of glycerol, while ratios larger than 10 present steady glycerol conversion and product distribution. It is thus concluded that $H_2$/glycerol molar ratio of 10 provides excess $H_2$ and does not need to be further increased. This is likely due to the ease of $H_2$ dissociative adsorption over Pt and Pd surfaces. High $H_2$ pressure is generally preferred to have better HDO performance. FIG. 1, however, does not support this trend, which may be explained by the aliphatic, rather than aryl, properties of glycerol. In summary, when Pt/H-ZSM-5 and Pd/H-ZSM-5 were used in GTH conversion, moderate $H_2$/glycerol ratio and atmosphere pressure provided good glycerol conversion and aromatic hydrocarbon yield.

Figure 2:
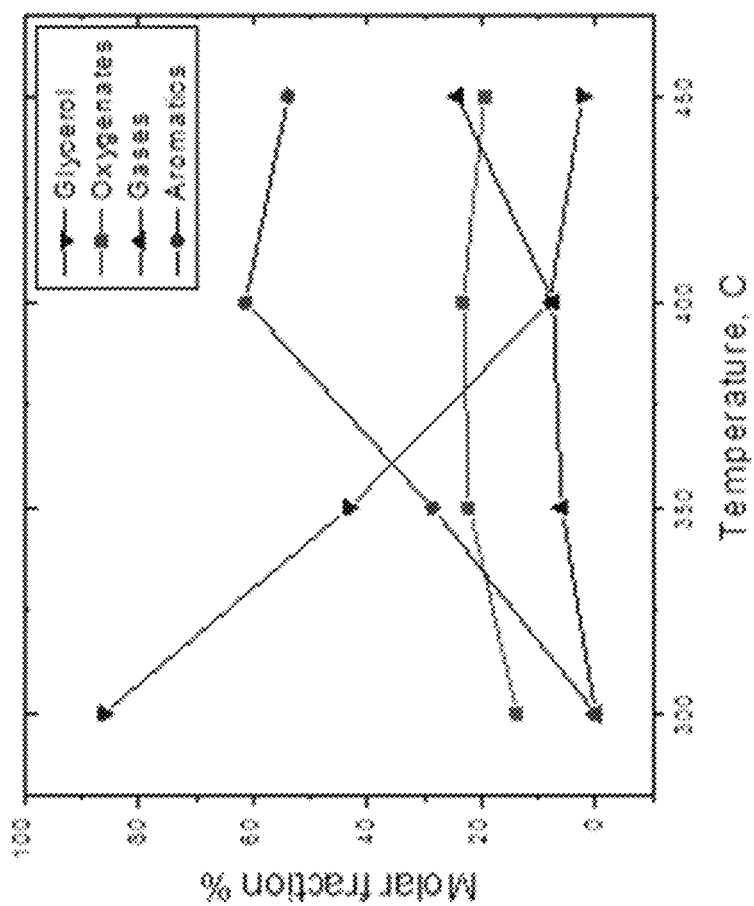
FIG. 2 shows the effect of temperature at 1 atm, 10 $H_2$/glycerol molar ratio and 6 g cat·hr/g glycerol.

The effects of temperature on glycerol conversion and product distribution are shown in FIG. 2. With increasing temperature, glycerol conversion also increases. At 300° C., which is slightly higher than boiling point of glycerol (290° C.), glycerol conversion is only ~15%, where almost all products are oxygenates and no gas/aromatics products are found. At 350-400° C., conversion of glycerol and yield of aromatics keep increasing, while molar fraction of oxygenates stays essentially the same, which indicates that oxygenates are converted to aromatics, as also noted above in the context of Table 1. At 450° C., however, yields of oxygenates and aromatics both decrease because more gases are produced due to high temperature that results in glycerol decomposition.

Along with C—O bond cleavages, three other types of glycerol bond cleavages may also occur in the presence of transition metal catalysts: C—H, O—H, C—C bonds. Transition metals are preferred for both activating glycerol binding and hydrogen dissociative adsorption. At lower temperature (up to ~200° C.), C—H and O—H bonds are easily broken due to their lower reaction barriers, which could be prevented by high $H_2$ content via possible hydrogenation. At higher temperature (300-400° C.), both C—C and C—O bond cleavages can occur simultaneously since their reaction barriers are higher than C—H/O—H bonds cleavages and close to each other. For example, both C—O and C—C bonds of glycerol are cleaved on the Pt surface at 350° C., forming ethanol, ethylene glycol and 1,2-propanediol. To obtain high aromatic hydrocarbons in GTH conversion, the key issue is how to break the C—O bond while keeping the C—C bond intact. Appropriate transition metals, such as Pt, Pd and Rh, favor the cleavage of C—O bonds in glycerol rather than other bonds since these metals promote the formation of hydrocarbons from polyols instead of CO and $H_2$.

Figure 3:
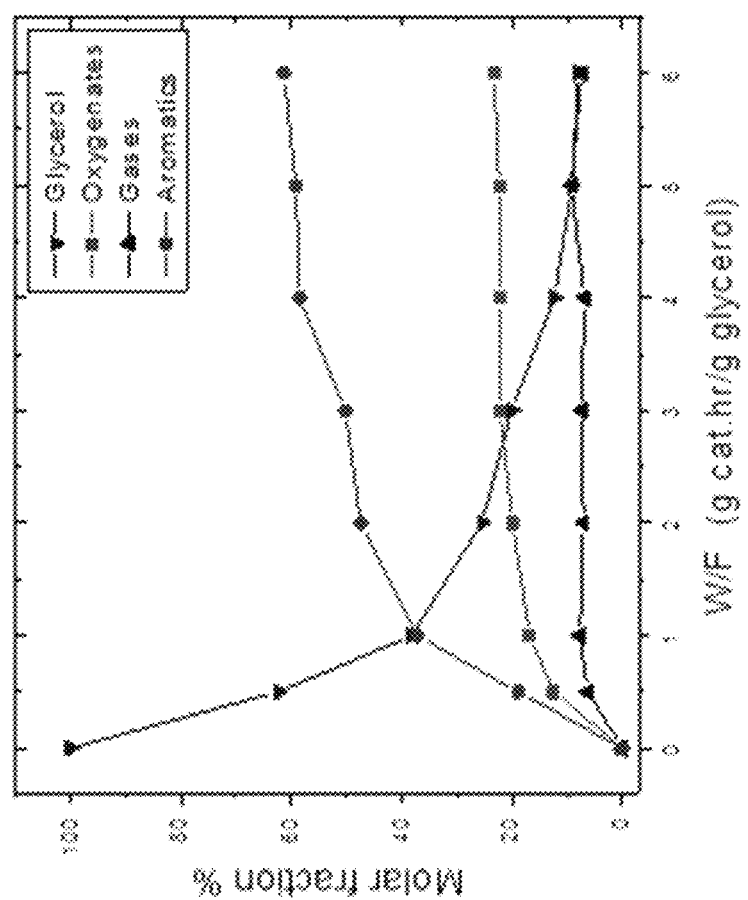
FIG. 3 shows the kinetic behavior at 1 atm, $H_2$/glycerol molar ratio at 10 and 400° C.

The kinetic behavior of GTH is shown in FIG. 3. It is found that if the contact time (W/F) is smaller than 0.1 g cat·hr/g glycerol, no hydrocarbons exist in the liquid products. As shown in FIG. 3, when W/F is 0.5 g cat·hr/g glycerol, ~20% aromatics are found in the liquid products. With increase of W/F, both glycerol conversion and aromatics yields increase, while for W/F greater than about 2 g cat·hr/g glycerol, gas and oxygenate contents remain essentially constant. This indicates that the latter two types of chemical species are converted to aromatics as contact time increases.

Thus, in this disclosure, it has been pointed out that utilization of byproduct glycerol improves biodiesel production in terms of both economics and sustainability. Conversion of glycerol to hydrocarbon (GTH) fuels is among the promising options, which provides additional renewable energy besides biodiesel, and contributes further to independence from fossil fuels. In the present disclosure, bifunctional catalysts (Pt/H-ZSM-5 and Pd/H-ZSM-5) were selected, prepared, characterized and tested for GTH conversion. The addition of noble metals enhances aromatics yield and both catalysts convert glycerol to hydrocarbon fuels effectively. Based on the results of experiments leading to this disclosure, a reaction mechanism involving hydrodeoxygenation and aromatization was proposed and discussed. Under optimized conditions, ~90% glycerol conversion and ~60% yield of aromatic hydrocarbons was achieved over the Pd/H-ZSM-5 catalyst.

From the foregoing detailed description, it is an objective of this disclosure to describe a method for producing hydrocarbons from glycerol. The method includes packing or placing a catalyst comprising a noble metal and a support for the noble metal into a reactor, and introducing a reactant mixture containing glycerol into the reactor in which the catalyst is placed such that the reactant mixture comes into contact with the catalyst. Such packing or placing the catalyst in the rector is generally well understood by those skilled in the art. The reactant mixture containing glycerol is then heated to a temperature for a "contact time". The phrase contact time is well understood by those skilled in chemical engineering processes and typical units for contact time are g cat·hr/g glycerol.

It should be noted that some embodiments of the methods of this disclosure, the reactor is a tubular reactor.

A non-limiting range of the temperature to which the reactant mixture is heated in the reactor is in the range of 473 K-1073 K. The contact time for the glycerol from the reactant mixture is in the non-limiting range of 30-1000 min·$g_{cat}$/mol. A non-limiting range for the partial pressure of glycerol in the reactant mixture is 0.1 to 1.0 atmosphere. In some versions of the method, the reactant mixture can include a reductant gas such as, but not limited to hydrogen or methane or a mixture thereof. The above amendment to the specification is to correct an informality (arising out of typographical error) pointed by the Examiner along with a suggested correction. Support for thick correction is found throughout the specification as originally filed. Applicant thanks the Examiner and submits no new matter is added by this correction.

In some embodiments of the method, the noble metal is platinum. A non-limiting range for the platinum loading in the "Pt/H-ZSM-5" combination is in the non-limiting range of 0.1 to 10.0 weight percent. In some embodiments of the method, the noble metal is palladium. A non-limiting range for the platinum loading in the "Pd/H-ZSM-5" combination is in the non-limiting range of 0.1 to 10.0 weight percent.

Methods of using support materials them are well known to those skilled in the art and are well described in literature. A non-limiting range for particles comprising such a support material is 200 mesh to 10 mesh. A non-limiting example of such a support materials suitable for the methods of this disclosure is ZSM-5 zeolite. If ZSM-5 zeolite is used as a support material, a non-limiting range for the specific surface area of the ZSM-5 zeolite is 100-800 m²/g. Further, a non-limiting range for Si/Al ratio of ZSM-5 zeolite for use a support material for the catalysts of this disclosure is 22 to 250.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible.

The invention claimed is:

1. A method for producing hydrocarbons from glycerol comprising:
    packing a catalyst comprising a noble metal and a support material into a reactor;
    introducing a reactant mixture containing glycerol into the reactor to be in contact with the catalyst, wherein the reactant mixture further comprises a reductant gas comprising methane; and
    heating the reactant mixture containing glycerol to a temperature for a contact time to produce hydrocarbons.

2. The method of claim 1, wherein the temperature is in a range of 473 K 1073 K.

3. The method of claim 1, wherein the contact time is in a range of 0.5-100 g cat·hr/g glycerol.

4. The method of claim 1, wherein a partial pressure of glycerol in the reactant mixture in a range of 0.1-1.0 atmosphere.

5. The method of claim 1, wherein the reductant gas further comprises hydrogen.

6. The method of claim 1, wherein the noble metal is platinum.

7. The method of claim 6, wherein a percentage of platinum in the catalyst is in a range of 0.1-10.0 weight %.

8. The method of claim 1, wherein the noble metal is palladium.

9. The method of claim 8, wherein a percentage of palladium in the catalyst is in a range of 0.1-10.0 weight %.

10. The method of claim 1, wherein the support material is ZSM-5 zeolite.

11. The method of claim 10, wherein a specific surface area of the ZSM-5 zeolite is in a range of 100-800 m²/g.

12. The method of claim 10, wherein a particle size range of the ZSM-5 zeolite is from 200 mesh to 10 mesh.

13. The method of claim 10, wherein a Si/Al ratio of the ZSM-5 zeolite is in a range of 22 to 250.

14. The method of claim 1, the reactor is a tubular reactor.

* * * * *